United States Patent
Ray et al.

(10) Patent No.: US 9,456,427 B1
(45) Date of Patent: Sep. 27, 2016

(54) DYNAMIC POWER OPTIMIZATION TO INCREASE COVERAGE

(71) Applicant: Sprint Communications Company, L.P., Overland Park, KS (US)

(72) Inventors: Amar N. Ray, Shawnee, KS (US); Warren B. Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 386 days.

(21) Appl. No.: 13/937,874

(22) Filed: Jul. 9, 2013

(51) Int. Cl.
*H04W 52/38* (2009.01)
*H04W 52/28* (2009.01)
*H04W 52/26* (2009.01)

(52) U.S. Cl.
CPC .......... *H04W 52/38* (2013.01); *H04W 52/265* (2013.01); *H04W 52/283* (2013.01)

(58) Field of Classification Search
CPC .......... H04W 72/00; H04W 72/0413; H04W 72/08; H04W 72/085; H04W 65/00; H04W 72/042; H04W 72/12; H04W 72/14; H04W 72/1231; H04W 24/02; H04W 52/14; H04W 52/38; H04W 52/283; H04W 52/265; H04L 1/00; H04L 1/18
See application file for complete search history.

(56) References Cited

U.S. PATENT DOCUMENTS

2009/0034474 A1* 2/2009 Yavuz et al. .................. 370/331
2011/0075579 A1* 3/2011 Seymour et al. ............. 370/252
2013/0272281 A1* 10/2013 Xu et al. ....................... 370/336
2014/0362832 A1* 12/2014 Rudolf et al. ................ 370/336
2015/0126238 A1* 5/2015 Simonsson ........... H04W 52/36
455/522

OTHER PUBLICATIONS

Alexiou et al., "Evaluation of Different Power Saving Techniques for MBMS Services"; Jan. 2009, EURASIP Journal on Wireless Communications and Networking, vol. 2009, Article ID 785927, 15 pages.*

Poppe et al., "Choosing the UMTS Air Interface Parameters, the Voice Packet Size and the Dejittering Delay for a Voice-over-IP Call between a UMTS and a PSTN Party", Apr. 22-26, 2001, INFOCOM 2001 Twentieth Annual Joint Conference of the IEEE Computer and Communications Societies, Proceedings, IEEE, Anchorage AK, 805-814.*

* cited by examiner

*Primary Examiner* — Pao Sinkantarakorn
*Assistant Examiner* — Michael Phillips

(57) ABSTRACT

The invention is directed to the optimization of power to increase a coverage area between a mobile device and the wireless communications network. Once it is determined that coverage is to be increased, a scheduling request is communicated to an access component (e.g., base station, eNodeB). The access component then sends a scheduling grant to the mobile device indicating that coverage will be increased. The determination to increase coverage is based on a total time delay of a packet sent from one device to another device, and a quality of the current voice or data session.

17 Claims, 7 Drawing Sheets

| MOS score | Quality of VOIP call experienced by the user |
|---|---|
| 4.3 - 5 | Very much satisfied |
| 4 - 4.3 | Satisfied |
| 3.6 - 4 | Many users satisfied |
| 3.1 - 3.6 | Many users dissatisfied |
| 2.6 - 3.1 | Nearly all users dissatisfied |
| Less than 2.6 | Not recommended |

DYNAMIC POWER OPTIMIZATION TO INCREASE COVERAGE

SUMMARY

A high-level overview of various aspects of the invention are provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, methods for improving coverage of a current voice or data session (e.g., voice over LTE call) by balancing the user's and network's needs of coverage, session quality (e.g., call quality, quality of service, quality of experience), and total time delay of the transmission of a packet. By modifying a number of hybrid automatic repeat requests (HARQs) and the duration of each subframe in each frame of a packet transmission, the packet can either have more or less time to acquire energy needed for packet transmission. In one embodiment, the more time the packet has to acquire energy, the farther it can reach, thus increasing coverage. By taking into consideration the session quality (e.g., voice quality), the possibility of disconnection of the session, signal power, signal to noise ratio (SINR), etc., it can be determined whether or not it is worth increasing coverage, as other items mentioned may be decreased, such as session quality.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
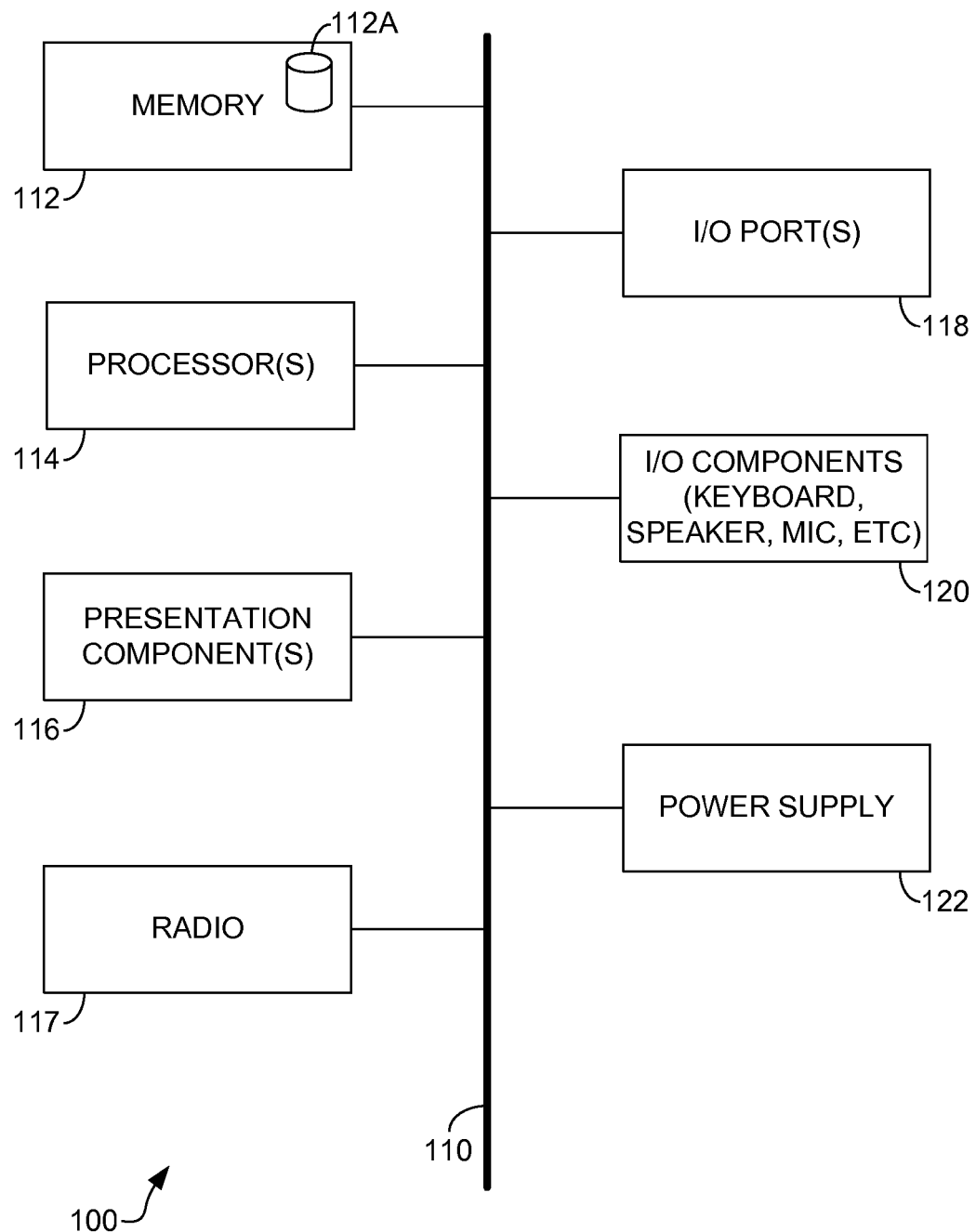
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed toward controlling a coverage area between a mobile device and a wireless communications network for a current voice or data session by considering various factors, including the current quality of the voice or data session and a total time delay of a packet sent from one mobile device to another receiving device. Other factors that may be taken into consideration include a MOS score, PESQ score, delay, packet loss, QoS, SINR, QoE, call duration, and level of acceptance. There are many other factors that may be analyzed when determining whether to increase coverage, and how much to increase coverage. As such, other factors not specifically mentioned herein are contemplated to be within the scope of the present invention. While previously these factors were not taken into consideration, embodiments of the present invention do take these factors into consideration so that a balance between total time delay, quality of the voice or data session, and coverage area can be balanced to provide the best user experience.

In one embodiment, transmission time interval (TTI) bundling is utilized to increase the amount of time that a packet has to acquire energy before its transmission to the wireless communications network. The coverage area, in one embodiment, is based on the time allotted for each packet transmission and on a number of hybrid automatic repeat requests (HARQs) that occur for the packet transmission. As will be illustrated in FIGS. 4-8 herein, the total energy consumption time duration for a packet is equivalent to a number of HARQs multiplied by a time per subframe. Typically, there is one HARQ per frame. Thus, in one example, if there are five frames, there are five HARQs. If each frame has four subframes and each subframe is 4 ms in length, the total energy consumption time would be 20 ms (5 HARQs×4 ms). This total energy consumption time can be increased or decreased based upon whether coverage or quality is more important at that particular time for a particular voice or data session. While we refer to voice or data sessions throughout this disclosure, in one embodiment, this is a voice over LTE (VoLTE) call.

The methods and systems described herein provide a controlled system to increase the energy consumption period using a combination of TTI and HARQ for increasing coverage at the cell edge during a session, such as a voice call, over LTE. Further, processes are described to set up the threshold of power gain before disrupting the quality of service of various services. While various technologies may be utilized, in one embodiment, LTE is utilized. The LTE standard defines a resource allocation structure in time and frequency domains. In the time domain, the LTE transmissions are organized into frames of 10 milliseconds (ms) in length. Each frame is composed of ten subframes of 1 ms duration. Each subframe is made up of two equal sized slots of 0.5 ms each. In the frequency domain, the subcarriers are spaced at 15 kHz giving a useful symbol duration. A group of twelve subcarriers (12×15=180 kHz) over one time slot (0.5 ms) is referred to as a resource block (RB). In the scenario where the network has chosen very short frame lengths, such as 1 ms, combined with reduced HARQ round trip times (8 ms) for improved latency. Within 40 ms of air interface delay as suggested by the industry standard, only 6 HARQ can be accommodated. Hence, during the air interface delay, the six HARQ transmissions can only collect energy over 6×1 ms=6 ms time period. This can be compared to conventional CS voice in a 3G system, in which energy is collected over a 20 ms frame. As such, the duration of time for consumption of energy in LTE is much shorter. Because of this, the VoLTE signal coverage is shorter in comparison to that of 3G signal propagation.

Embodiments of the present invention allow for a controller, either at the access component, the mobile device, or both, to be able to dynamically analyze the total time delay of a packet through the network by determining the location of the mobile devices. In one embodiment, if the controller sees one party moving out of the network, the network delay will increase as a consequence and the total end-to-end delay will increase. Consequently, to keep the Quality of Service at an acceptable level, less time will be available for TTI bundling. As such, the number of HARQs decreases, the time for consuming energy at the wireless interface decreases, and coverage thus decreases. Similarly, if the controller sees a party moving into the network, end to end delay (total time delay) increases, as the number of HARQs increase, the time for consuming energy increases, gain improves, and consequently coverage increases.

In a first aspect of the present invention, computer-readable media having computer-executable instructions embodied thereon that, when executed, perform a method for dynamically optimizing power to increase a coverage area between a mobile device and a wireless communications network. The method includes determining to increase coverage for a current voice or data session within the wireless communications network, and, at a first mobile device associated with the current voice or data session, communicating a scheduling request to an access component requesting the increased coverage. The method also includes receiving a scheduling grant from the access component indicating a determination to increase the coverage between the first mobile device and the wireless communications network for the current voice or data session. The determination is based on one or more of a total time delay of a packet sent from the first mobile device to a second mobile device, wherein the total time delay is based, in part, on a current location of the first mobile device and the second mobile device associated with the current voice or data session, and a quality of the current voice or data session.

In a second aspect of the present invention, computer-readable media having computer-executable instructions embodied thereon that, when executed, perform a method for dynamically optimizing power to increase a coverage area between a mobile device and a wireless communications network. The method includes, at an access component in the wireless communications network, controlling a coverage area between a first mobile device and the wireless communications network, wherein the first mobile device is associated with a current voice or data session. Further, the method includes determining to transfer control of the controlling of the coverage area between the first mobile device and the wireless communications network to the first mobile device such that the first mobile device determines when a larger coverage area with the wireless communications network is needed. The method also includes transferring the control of the controlling of the coverage area between the first mobile device and the wireless communications network to the first mobile device.

In a third aspect of the present invention, computer-readable media having computer-executable instructions embodied thereon that, when executed, perform a method for dynamically optimizing power to increase a coverage area between a mobile device and a wireless communications network. The method includes, at an access component in the wireless communications network, determining that a coverage area between a first mobile device and the wireless communications network is to be increased from an existing coverage area to an expanded coverage area. This determination is based on an estimated time delay of a transmission of a packet based on a location of the first mobile device and a second mobile device associated with a current voice or data session, and a quality of service associated with the current voice or data session. Further, the method includes determining a quantity of times that the first mobile device is to send each packet to the wireless communications network and a period of time associated with each packet transmission, the quantity of times and the period of time based on a balance between the expanded coverage range, the estimated time delay of the transmission of the packet, and the quality of service associated with the current voice or data session. The method also includes communicating to the first mobile device an indication of the quantity of times that the first mobile device is to send each packet to the wireless communications network and the period of time associated with each packet transmission.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Component 112A may be an application or code that is stored on device 100 that carries out one or more processes, as described herein. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
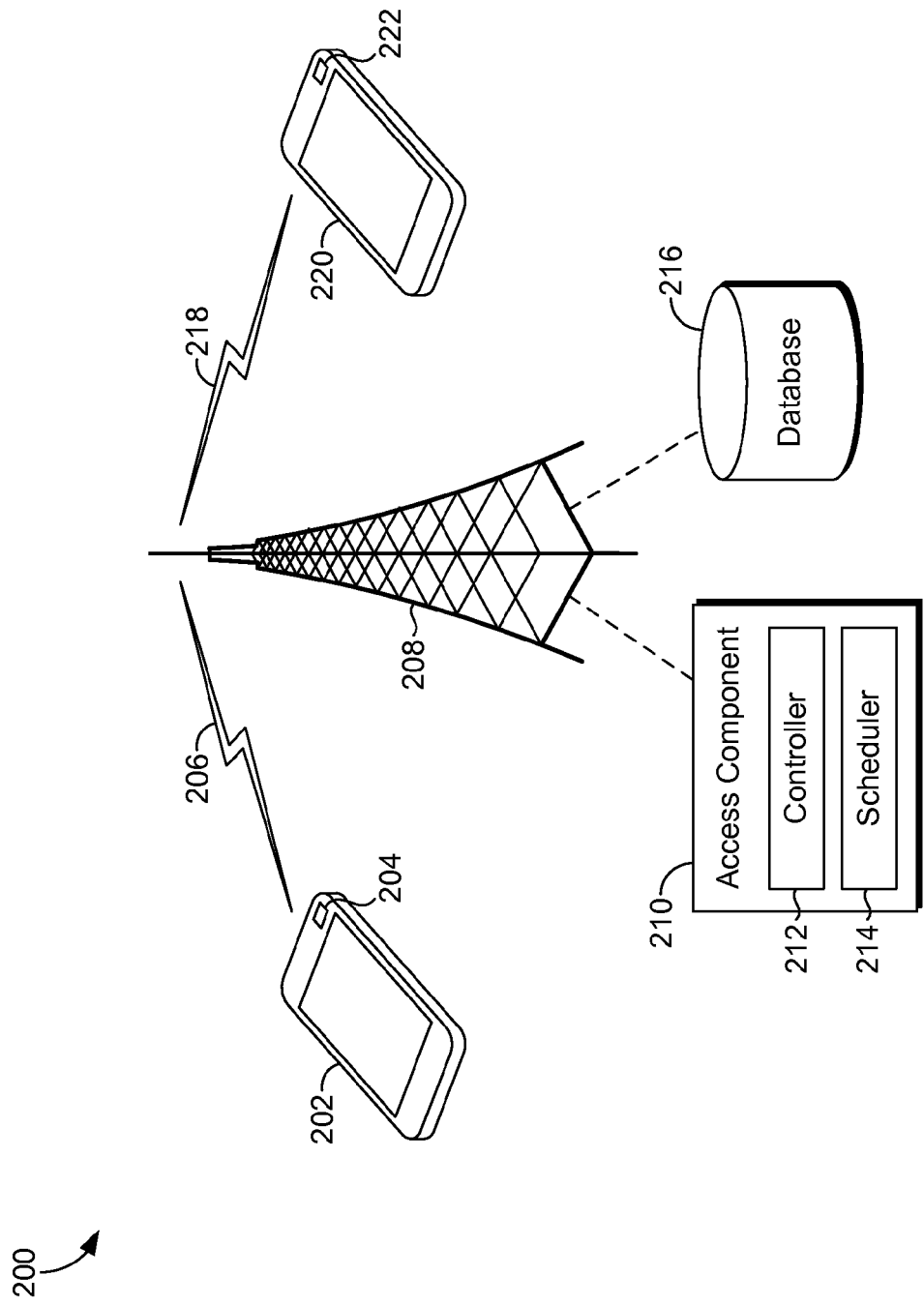
FIG. 2 depicts an illustrative operating system for carrying out embodiments of the present invention.

FIG. 2 depicts an illustrative operating environment, referenced generally by the numeral 200, and illustrates an illustrative networking environment that enables a dynamic optimization of power to increase a coverage area of a mobile device in a wireless communications network. The illustrative operating environment 200 shown in FIG. 2 is merely an example of one suitable operating environment and is not intended to suggest any limitation as to the scope of use or functionality of embodiments of the present invention. Neither should the operating environment 200 be interpreted as having any dependency or requirement related to any single module/component or combination of modules/components illustrated therein.

Mobile devices 202 and 220, in one embodiment, are the types of device described in connection with FIG. 1 herein. The mobile devices 202 and 220 may support multiple technologies such as CDMA 1XA, GPRS, EvDO, TDMA, GSM, WiMax technology, LTE, LTE Advanced, and the like. Alternatively, the mobile device 202 may support one type of technology, such as LTE (LTE and/or LTE Advanced), and more specifically may utilize voice over LTE (VoLTE) for voice calls. Any and all such aspects, and any combination thereof, are contemplated as being within the scope of the invention. The mobile devices 202 and 220 may include a client application that helps carry out aspects of the technology described herein. Client applications 204 and 222 may each be a resident application on the handset used by the mobile device to control a coverage area of the mobile device and an access component using embodiments of the present invention. More specifically, client applications 204 and 222 may include a mobile device controller that is either manually or automatically controlled to control a coverage area or coverage range between the mobile device and the access component that the mobile device is currently using in the wireless communications network. Whenever we speak of an application, software, or the like, we are really referring to one or more computer-readable media that are embodied with a set of computer-executable instructions that facilitate various actions to be performed. We will not always include this lengthy terminology because doing so would make this document more difficult to read. As mentioned, in one embodiment, the client application is utilized by the mobile device to optimize power, which in turn allows for the ability to increase a coverage area or coverage range between the mobile device and the access component.

To access the wireless communications network, the mobile device 202 may be in communication with a base station via wireless-telecommunications links such as, for example, wireless-telecommunications link 206, which allows for data to be wirelessly communicated between the mobile device 202 and the cell tower 208. In FIG. 2, the base station is referred to as the access component 210. The mobile device 202 may communicate with the access component 210 via the wireless-telecommunications link 206 to facilitate attachment of the mobile device 202 to the access component 210. Once attached, the mobile device 202 may also use the wireless-telecommunications link 206 to send and/or receive voice call information and/or data information as well as other messaging information. In one aspect, the mobile device 202 may utilize the wireless-telecommunications link 206 to send scheduling requests and to receive scheduling grants to and from the cell tower 208.

Wireless-telecommunications link 206 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a communications network, such as a WLAN connection using 802.11 protocol. A short range connection may also utilize mobile broadband, which provides wireless Internet access using a mobile broadband router. One example of mobile broadband technology is Evolution Data Optimized, or EVDO. EVDO relies on signal from a wireless tower rather than a physical connection like a phone line or cable. An EVDO modem receives the signal and allows a user to connect to the Internet. Another example of mobile broadband is HSPA. A long-range connection may include a connection using one or more of CDMA, GPRS, GSM, TDMA, and 802.16.

Mobile device 220 may also be in communication with the cell tower 208 if mobile device 220 is in the same network as mobile device 202 and is attached to the same cell tower. Alternatively, for at least a portion of a voice or data session, the mobile device 220 may be assigned to a different cell tower with the same network, or may be in a different network all together. As such, even though mobile device 220 is illustrated in FIG. 2 as having a wireless-telecommunications link 218 for communication with the cell tower 208, this is simply one embodiment, as other embodiments are also within the scope of the present invention (e.g., mobile device 220 in a network different from that of mobile device 202 or assigned to a different cell tower based on the location of mobile device 220).

Generally, the access component 210 provides access to what some skilled artisans refer to as a wireless communications network, also termed a core network. A wireless communications network may comprise one or more of the components illustrated in FIG. 2, including the cell tower 208, the access component 210, and the database 216. To the contrary, not all components that make up a wireless communications network are shown. Also, not all connections or possible connections are shown. The access component 210 may be one or more of a base transceiver station (BTS) tower, eNodeB, a WiFi Router, a Mobile Hotspot, and any other device that facilitates communication between mobile device 202 and the network. For example, if the wireless communications system utilizes LTE technology, the access component would be termed eNodeB. In one embodiment, the access component 206 includes both a WiFi Router and a BTS tower. In another embodiment, access component 206 is a BTS tower. A radio network controller (RNC) (not shown) performs various functions, such as managing radio channels, power control, load control, admission control, packet scheduling, handover control, macrodiversity, security functions, and mobility management. A base station controller (BSC) (not shown) acts as the intelligence behind base transceiver stations (BTS) and handles allocation of radio channels, receives measurements from mobile devices, and controls handovers from one BTS to another BTS. The hardware associated with the access component 210 may include, for example, the actual radio mast or tower (208), as well as antennas, transceivers, GPS receivers, electrical power sources, digital signal processors, control electronics, and the like that are associated with the radio tower.

Embodiments of the present invention may be used with different technologies or standards, such as, for example, CDMA 1XA, GPRS, EvDO, TDMA, GSM, WiMax technology, LTE, and LTE Advanced. Other technologies and standards not listed herein are also contemplated to be within the scope of the present invention.

While illustrated separately, the access component 210 and the database 216 may be a part of the cell tower 208, but are illustrated separately for clarity. The access component 210 may include various subcomponents, including a controller 212 and a scheduler 214. The controller 212, also termed the access component controller herein, is responsible for controlling how much coverage is available between a mobile device, such as mobile device 202, and the cell tower 208. Utilizing embodiments described herein, the controller 212 is able to tell the mobile device 202 to alter the number of times the mobile device 202 sends each packet to the wireless communications network, and a period of time associated with each packet transmission. This will be explained in greater detail in relation to FIGS. 4-8. The quantity of times that each packet is to be sent from the mobile device 202 to the wireless communications network is indicative of a quantity of Hybrid Automated Repeat Request (HARQs) that are to be performed by the mobile device 202. Each HARQ allows for the packet to consume energy for transport to the access component 210 in the wireless communications network. The more energy consumed by the packet, the farther it can travel, thus increasing coverage.

Figures 9, 10:
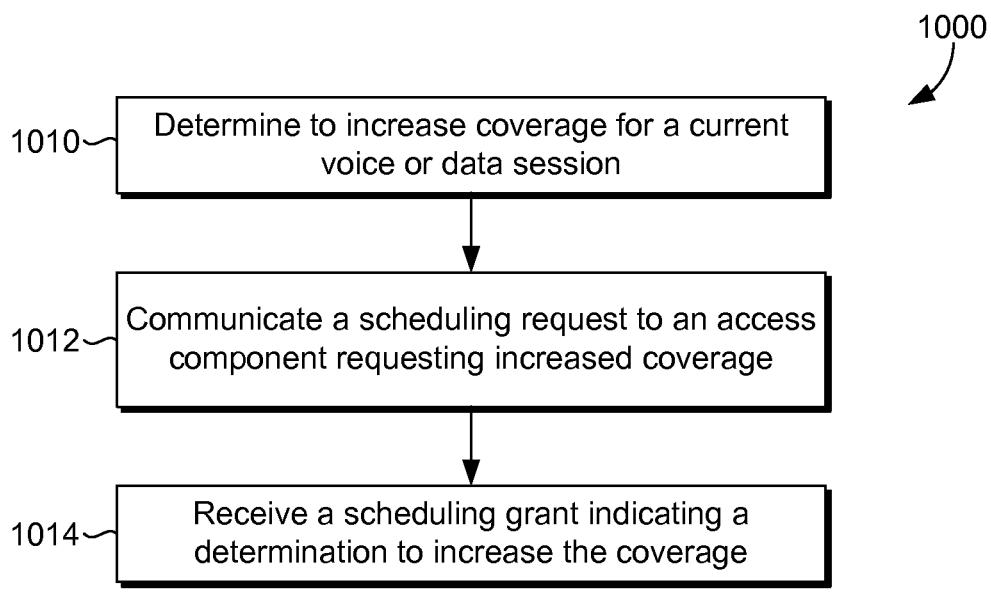
FIG. 9 depicts a chart of threshold values for the Mean Opinion Score (MOS) indicating a quality of a Voice Over LTE (VoLTE) call, in accordance with an embodiment of the present invention.
FIGS. 10-12 depict flowcharts illustrating methods for dynamically optimizing power to increase a coverage area between a mobile device and a wireless communications network, in accordance with embodiments of the present invention.

Before making the determination to increase coverage, the access component 210 may take various factors into consideration. For example, the Quality of Service (QoS) represents the quality of a voice call from the perspective of the wireless communications network. The QoS is based on a Mean Opinion Score (MOS) that is a numerical measure of a subjective quality of the current voice or data session. FIG. 9 illustrates an exemplary table listing ranges of MOS score that are indicative of the quality of a voice over IP (VOIP) call experienced by the user. In addition to the QoS, the access component 210 may consider a total time delay of a packet sent from the mobile device 202 to the access component 210, and then on to another mobile device involved in the voice or data session (e.g., a VoLTE voice call), such as mobile device 220. The total time delay is based, in part, on a current location of mobile devices 202 and 220. The longer the total time delay of a packet, the lesser the quality of the session. As such, a balance needs to be considered between the quality of the voice or data session and the coverage. Information regarding QoS may be stored in the database 216, such that the access component 210 can consult the database 216 to retrieve information when needed.

In one embodiment, the controller is located just at the access component 210. Here, a centralized controller at the access component 210 can be used to analyze the QoS and to control the scheduling grant for all calls to the mobile devices connected to the same access component 210. While this first embodiment may be more cost effective, in an alternate embodiment, the controller is located just at the mobile device, embodied in client application 204 for mobile device 202 and/or client application 222 for mobile device 220. In this embodiment, the software and hardware to analyze the voice quality or QoS is included within the mobile device. Further, the scheduling request would also be controlled by the mobile device. In yet an alternative embodiment, a controller is utilized at both the mobile device and the access component 210. This allows for either the mobile device or the access component to control the coverage, and even allows for the control to be handed back and forth between the two based on various factors that are considered.

While it has been discussed that the packet acquires energy at the mobile device before being sent to the wireless communications component, and in particular to an access component associated with the network, the packet also acquires energy at the access component before it is transmitted to the receiving device. The receiving device, in one embodiment, is a mobile device. As such, embodiments of the present invention described herein may be utilized at the access component, such that the number of HARQs and the period of time associated with each packet transmission may be modified at the access component to increase coverage between the access component and the receiving device.

Figure 3:
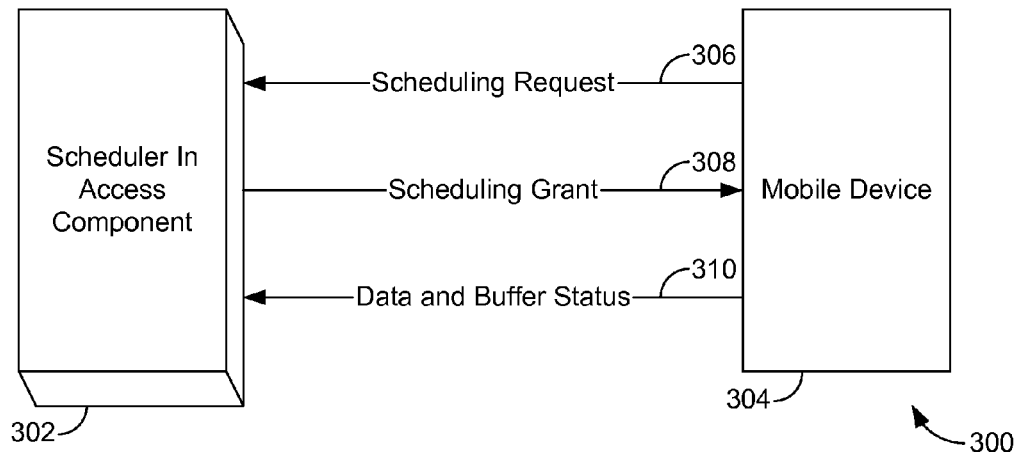
FIG. 3 depicts a flow diagram illustrating a method of scheduling resource allocation between a scheduler and a mobile device, in accordance with an embodiment of the present invention.

Turning now to FIG. 3, a flow diagram is depicted illustrating a method 300 of scheduling resource allocation between a scheduler and a mobile device, in accordance with an embodiment of the present invention. As shown in FIG. 2, the scheduler may be a sub-component of the access component. As such, the scheduler 302 first receives a scheduling request 306 from the mobile device 304. The schedule request is a request from the mobile device 304 requesting more coverage. In return, the scheduler 302 sends a scheduling grant 308 to the mobile device 304. The scheduling grant 308 may include various information such as how many times the mobile device 304 should send each packet to the access component, and a period of time associated with each packet transmission. As mentioned, the longer the time that the packet has to accumulate energy, the more coverage there is between the mobile device 304 and the wireless communications network. Data and buffer status information 310 may then be sent from the mobile device 304 to the scheduler 302.

Figure 4:
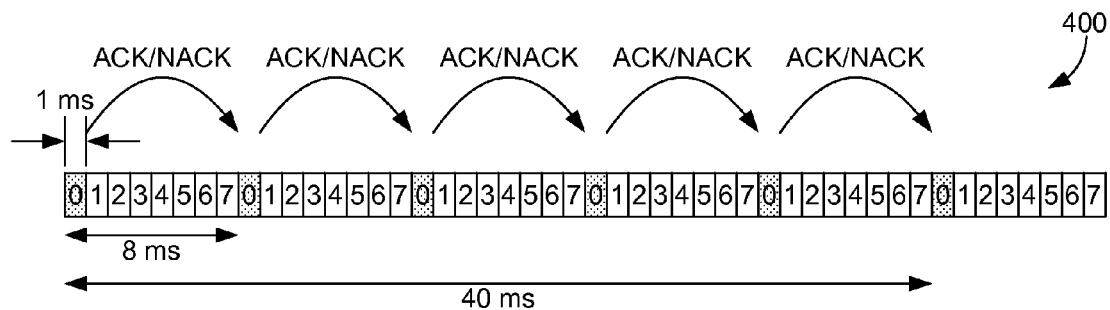
FIG. 4 depicts a representation of frames for packet transmission, in accordance with an embodiment of the present invention.

FIG. 4 depicts a representation 400 of frames for packet transmission, in accordance with an embodiment of the present invention. A typical frame for data transmission is shown in FIG. 4. Each frame is 8 ms in length, each frame having 8 separate subframes of 1 ms each. The first subframe of each frame with a "0" is representative of a HARQ. As such, in FIG. 4, there are 6 HARQs that take place. Therefore, the total energy consumption time is 6 HARQs×1 ms=6 ms. The 40 ms shown in FIG. 4 is the air interface delay. Further, the acknowledgment receipt of data and the data not received acknowledgement (ACK/NACK) process occurs five times for a 40 ms air interface delay.

Figure 5:
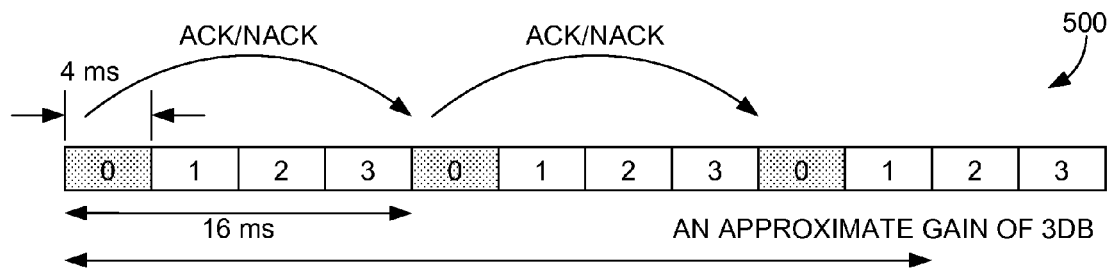
FIG. 5 depicts a representation of frames for packet transmission using transmit time interval bundling, in accordance with an embodiment of the present invention.

FIG. 5 depicts another representation 500 of frames for packet transmission using transmit time interval bundling, in accordance with an embodiment of the present invention. FIG. 5 is different from FIG. 4 in that FIG. 5 utilizes transmission time interval (TTI) bundling. Thus, FIG. 5 illustrates the consumption of energy at the air interface of, here, a VoLTE call with TTI. TTI bundling effectively creates a longer time length for consumption of more energy at the air interface. In this process, the mobile device autonomously retransmits a packet with a pre-defined redundancy version over four consecutive subframes. One ACK/NACK is generated for each 4-subframe bundle. To ensure sufficient time for ACK/NACK processing, the time per frame is doubled from 8 ms (as shown in FIG. 4) to 16 ms (as shown in FIG. 5). As shown, there are three HARQ transmissions to stay within the 40 ms air interface delay budget. In this process, the transmission can accumulate energy over 3 HARQ×4 ms=12 ms. In terms of gain, it indicates an approximate 3 dB improvement in coverage.

In the LTE air interface, with voice traffic, the signaling overhead may be as high as 60 percent because of the small size of the packets. Unlike wire-line fiber network, in UTRAN a single eNodeB may be communicating with many mobile devices at the same time—some idle, some in voice calls, and others in data sessions. The eNodeB has a finite total data bandwidth available to it. Hence, the signaling burden per sector is inevitable. The industry standard for VoLTE has provided various solutions. One, as mentioned is TTI, which is a process that is very effective at the cell edge and can be expressed in terms of transmission performance using HARQ.

Figure 6:
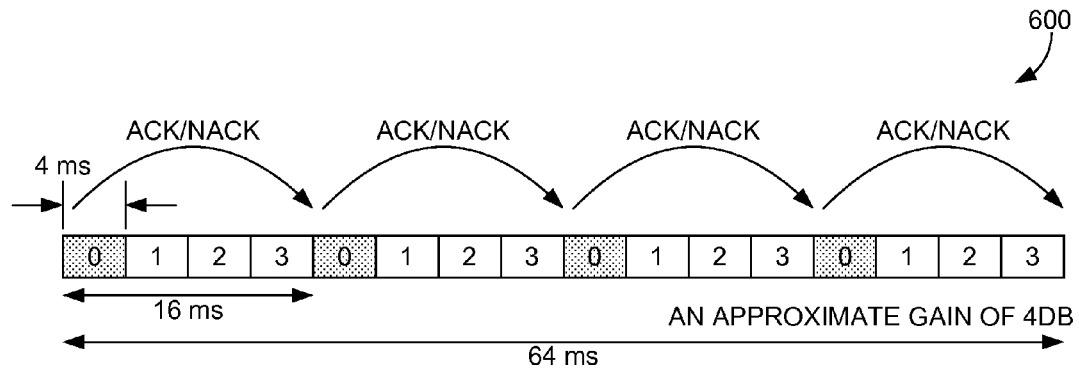
FIG. 6 depicts a representation of frames for packet transmission using transmit time interval bundling, in accordance with another embodiment of the present invention.

Referring now to FIG. 6, depicted is a representation 600 of frames for packet transmission using transmit time interval bundling, in accordance with another embodiment of the present invention. Here, the total delay is increased to 64 ms, which represents the consumption of energy at the air interface of a VoLTE call with TTI. To ensure sufficient time for ACK/NACK processing, the time per frame is again 16 ms, but here, there are four HARQ transmissions, and as such the transmission can accumulate energy over 4 HARQs×4 ms=16 ms. In terms of gain, it indicates an approximate 4 dB improvement in coverage.

Figure 7:
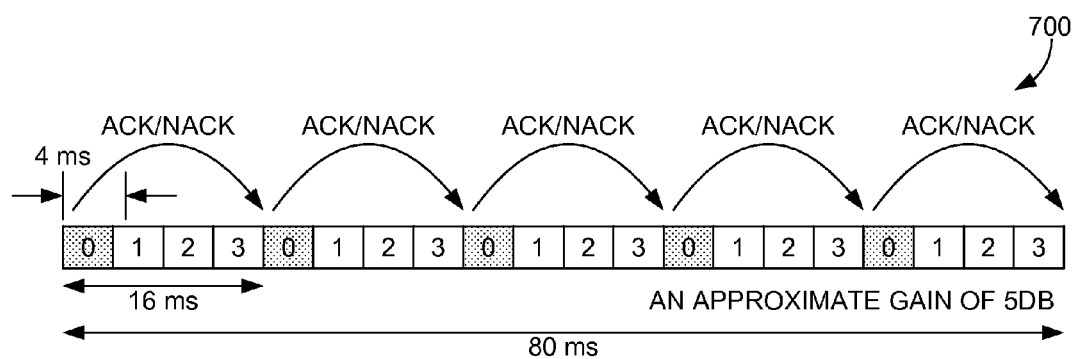
FIG. 7 depicts a representation of frames for packet transmission using transmit time interval bundling, in accordance with another embodiment of the present invention.

FIG. 7 depicts a representation 700 of frames for packet transmission using transmit time interval bundling, in accordance with another embodiment of the present invention. Here, the total delay is 80 ms. To ensure sufficient time for ACK/NACK processing, the time per frame is now 16 ms. There are also 5 HARQ transmissions for a total of an 80 ms air interface delay budget. In this process, the transmission can accumulate energy over 5 HARQs×4 ms=20 ms. An approximate gain of 5 dB improvement in coverage is realized.

Figure 8:
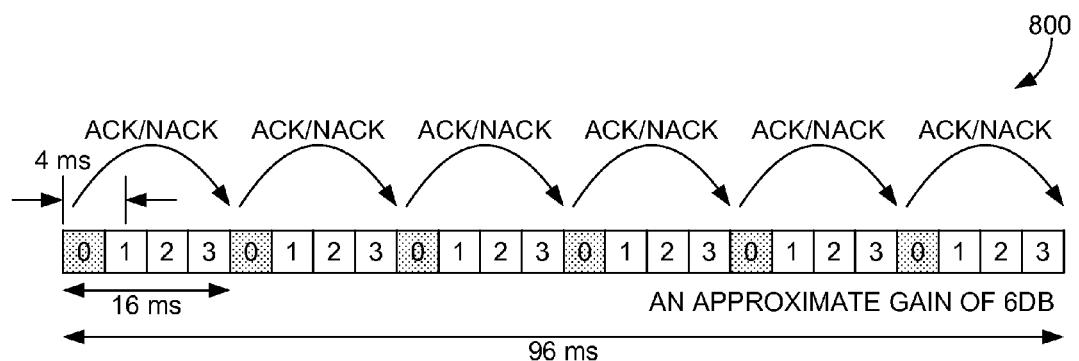
FIG. 8 depicts a representation of frames for packet transmission using transmit time interval bundling, in accordance with another embodiment of the present invention.

FIG. 8 depicts a representation 800 of frames for packet transmission using transmit time interval bundling, in accordance with another embodiment of the present invention. Further TTI bundling occurs for a total delay of 96 ms. To ensure sufficient time for ACK/NACK processing, the time for each frame is 16 ms with 6 HARQ transmissions. The packet transmission accumulates energy over 6 HARQs×4 ms=24 ms. This represents an approximate gain of 6 dB of improvement in coverage.

Turning now to FIG. 9, a chart 900 is illustrated of threshold values for the Mean Opinion Score (MOS) indicating a quality of a Voice over LTE (VoLTE) call, in accordance with an embodiment of the present invention. As previously mentioned, MOS is used as an indicator of the QoS of a particular voice or data session. The MOS ranges may vary, and thus chart 900 is provided only as an example of MOS ranges that represent the quality of a voice call. Here, an MOS score of 4.3-5 represents a user being very much satisfied, and a score of less than 2.6 is a very low score indicating a very low quality of call. Also as mentioned, the QoS is balanced with the coverage between the access component and the mobile device in association with a particular voice or data session to determine whether it is worth sacrificing call quality for more coverage.

FIG. 10 depicts a flowchart illustrating a method 1000 for dynamically optimizing power to increase a coverage area between a mobile device and a wireless communications network, in accordance with an embodiment of the present invention. In one embodiment, the wireless communications network is an LTE network, but other technologies are contemplated to be within the scope of the present invention. Initially, at step 1010, it is determined, such as by a mobile device, to increase coverage for a current voice or data session within the wireless communications network. In one instance, the current voice or data session is a voice call using LTE technology, otherwise referred to as a voice over LTE (VoLTE) call. The coverage is increased between a mobile device and the wireless communications network (e.g., an access component, such as a base station or eNodeB). Increased coverage may allow the mobile device to move farther away from the access component while continuing the voice or data session with another device. At step 1012, a scheduling request is communicated from a first mobile device to an access component, such as a scheduler in the access component. The scheduling request contains information that is needed to request increased coverage from the access component. A scheduling grant, sent from the access component, is received at step 1014 indicating a determination to increase the coverage for the current voice or data session within the wireless communications network.

The determination to increase coverage, in one embodiment, is based on a total time delay of a packet sent from the first mobile device to a second mobile device, where both mobile devices are involved with the current voice or data session. The total time delay may be based, in part, on the current location of the first and second mobile devices that are associated with the current voice or data session. The determination is also based on a quality of the current voice or data session, such as a QoS. In the case of QoS, it is based on an MOS that is a numerical measure of a subjective quality of the current voice or data session.

In one embodiment, the first mobile device receives an indication from the access component as to a quantity of times that each packet is to be sent from the first mobile device to the wireless communications network. For instance, referring to FIG. 7, as mentioned, there are 5 HARQs that take place, each being 4 ms. In this instance, the first mobile device would send each packet to the wireless communications network 5 times, each transmission being 16 ms with 4 sub frames each of 4 ms. A HARQ allows for the packet to consume energy for transport to the access component in the wireless communications network. A HARQ is a combination of high-rate forward error-correcting coding and ARQ error-control. The original data is encoded with a forward error correction code, and the parity bits are either immediately sent along with the message or only transmitted upon request when a receiver detects an erroneous message.

The access component may also send an indication to the first mobile device as to a period of time associated with each packet transmission. Referring again to FIG. 7, the period of time would be 16 ms for each packet transmission.

The access component would also tell the first mobile device that there are 4 subframes in each frame, each subframe being 4 ms in length.

Figure 11:
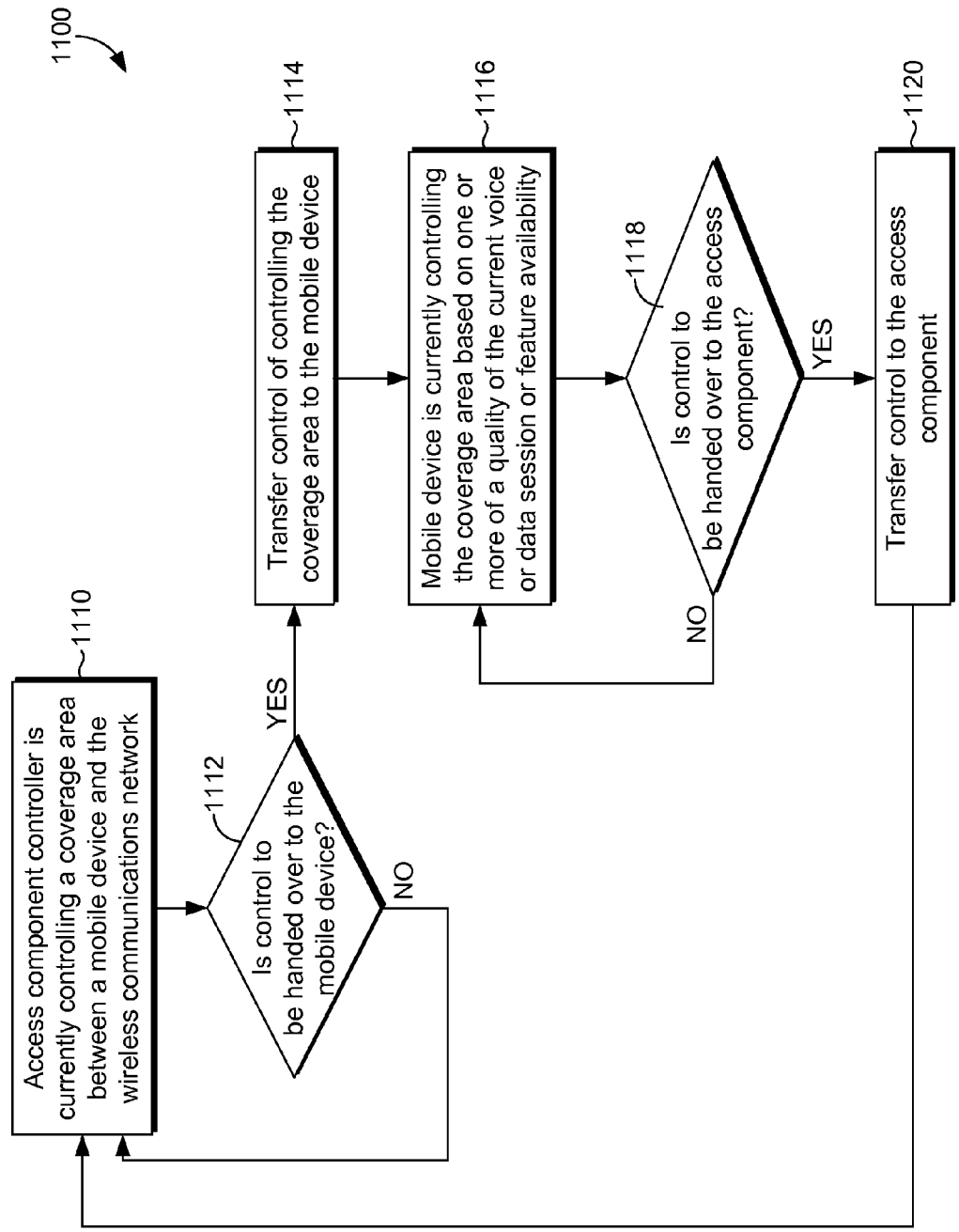

FIG. 11 depicts another flowchart illustrating a method 1100 for dynamically optimizing power to increase a coverage area between a mobile device and a wireless communications network, in accordance with an embodiment of the present invention. At step 1110, the access component, such as a controller, is currently controlling a coverage area between a first mobile device and the wireless communications network. The first mobile device is involved in a current voice or data session (e.g., VoLTE call). Controlling the coverage area may include determining a quantity of times that the first mobile device is to send each packet to the wireless communications network, and determining a period of time associated with each packet transmission. The quantity of times and the period of time are based on a balance between the coverage area between the first mobile device and the wireless communications network, an estimated time delay of the packet transmission, and a quality of service associated with the current voice or data session.

At step 1112, it is determined whether control is to be handed over to the mobile device. If control is to be handed over to the mobile device, control of the coverage area is transferred to the mobile device at step 1114. In one embodiment, the access component decides that control is to be handed over to the mobile device, but in an alternative embodiment, the mobile device makes this determination. This determination, in one embodiment, is based on a current load of the access component or a user request. As such, the access component may have had too heavy of a load to control the coverage area, or a user may request the control. If control is not to be handed over to the mobile device at that time, the flow continues to step 1110, where the access component controller is controlling the coverage area.

At step 1116, the mobile device is currently controlling the coverage area based on one or more of a quality of the current voice or data session or feature availability. The quality of the call is from the mobile device or the user's perspective. In one embodiment, the user of the mobile device may manually control the coverage area. Here, the mobile device may use the quality of experience to manual control the coverage area. For instance, the user may know that he or she is on the verge of being out of the coverage area, but may need extended coverage. If the user is willing to sacrifice call quality, the user may opt to extend coverage knowing that the call quality will decline. In one specific example, the user may be on an emergency 911 call. With coverage quickly fading, the user may manually be able to indicate that he or she needs extended coverage area because of the nature of the call. In this instance, call quality would not be important. Along these lines, in one embodiment, the mobile device may provide an audible or visual indication that the user is close to leaving the coverage area, which likely will result in a dropped call. The user may then have the option to extend coverage while sacrificing call quality, or can decide that a dropped call is acceptable at this point. Feature availability refers to the access of a particular feature or factor that can be measured by either the mobile device or the access component. For instance, the access component has access to the SINR, so at a particular time, it may make more sense for the access component to control the coverage. However, it may work the other way if the mobile device has access to a feature, such as the quality of the current session as experienced by the user of the mobile device.

At step 1118, it is determined whether control is to be handed over to the access component. If not, the flow reverts back to step 1116, where the mobile device is controlling the coverage area. Otherwise, control is transferred to the access component at step 1120.

Figure 12:
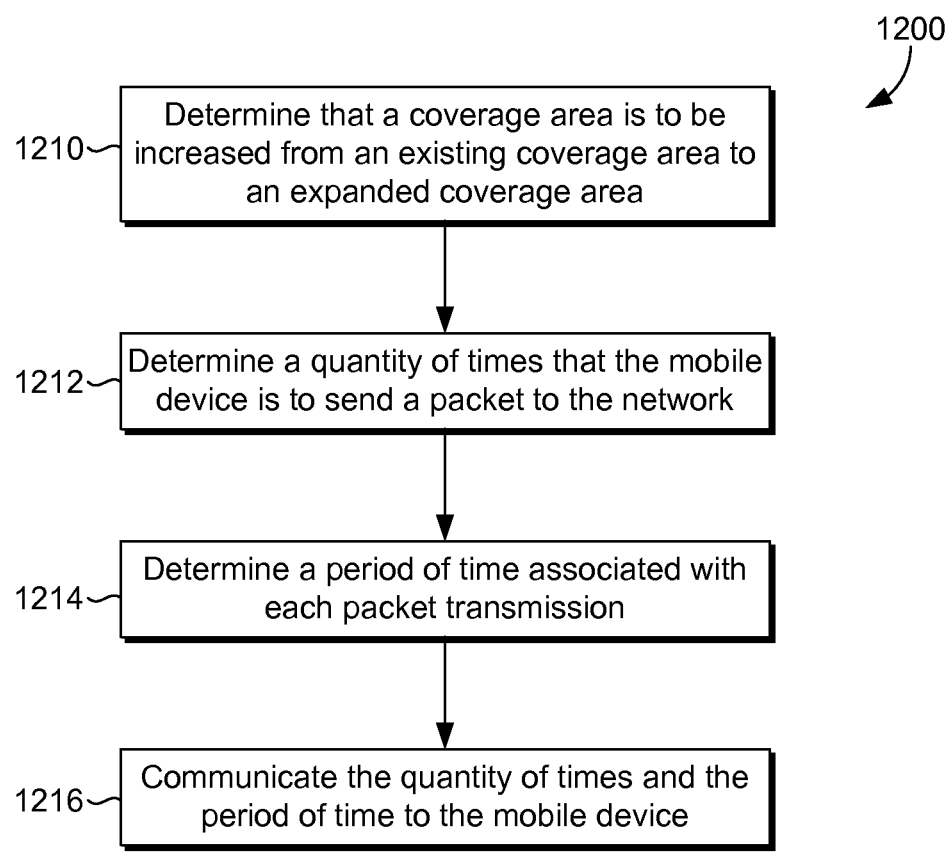

FIG. 12 depicts another flowchart illustrating a method 1200 for dynamically optimizing power to increase a coverage area between a mobile device and a wireless communications network, in accordance with an embodiment of the present invention. At step 1210, it is determined that a coverage area is to be increased from an existing coverage area to an expanded coverage area. This determination is based on, for example, an estimated time delay of a transmission of a packet based on a location of the first and second mobile devices associated with the current voice or data session, and a quality of service associated with the current voice or data session. A quantity of times that the mobile device is to send a packet to the network is determined at step 1212, and a period of time associated with each packet transmission is determined at step 1214. A balance is reached between having an expanded coverage area, an estimated time delay of the transmission of the packet, and the quality of service. At step 1216, the quantity of times and the period of time are communicated to the mobile device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, perform a method for dynamically optimizing power to increase a coverage area between a mobile device and a wireless communications network, the method comprising:
   determining, at an access component in the wireless communications network, to transfer control of controlling the coverage area between a first mobile device and the access component to the first mobile device such that the first mobile device determines when a larger coverage area with the access component is needed;
   transferring the control of controlling the coverage area between the first mobile device and the access component to the first mobile device;
   determining, at the first mobile device, to increase coverage area for a current voice or data session within the wireless communications network;
   at the first mobile device associated with the current voice or data session, communicating a scheduling request to the access component requesting the increased coverage area; and
   receiving a scheduling grant from the access component indicating the determination to increase the coverage area between the first mobile device and the wireless communications network for the current voice or data session, wherein the determination is based on one or more of:
(1) a total time delay of a packet sent from the first mobile device to a second mobile device, wherein the total time delay is based, in part, on a current location of the first mobile device and the second mobile device associated with the current voice or data session, and
(2) a quality of the current voice or data session.

2. The non-transitory media of claim 1, further comprising receiving from the access component an indication of a quantity of times that each packet is to be sent from the first mobile device to the wireless communications network.

3. The non-transitory media of claim 2, wherein the quantity of times that each packet is to be sent from the first mobile device to the wireless communications network is indicative of a quantity of Hybrid Automated Repeat Requests (HARQs) that are to be performed.

4. The non-transitory media of claim 3, wherein the HARQs allow for the packet to consume energy for transport to the access component in the wireless communications network.

5. The non-transitory media of claim 1, further comprising receiving from the access component a period of time associated with each packet transmission.

6. The non-transitory media of claim 1, wherein the quality of the current voice or data session is a Quality of Service (QoS), and wherein the QoS is based on a Mean Opinion Score (MOS) that is a numerical measure of a subjective quality of the current voice or data session.

7. The non-transitory media of claim 1, wherein the wireless communications network is an LTE network.

8. The non-transitory media of claim 1, wherein the current voice or data session utilizes voice over LTE (VoLTE) technology.

9. Non-transitory computer-readable media having computer-executable instructions embodied thereon that, when executed, perform a method for dynamically optimizing power to increase a coverage area between a mobile device and a wireless communications network, the method comprising:
at an access component in the wireless communications network, controlling a coverage area between a first mobile device and the wireless communications network, wherein the first mobile device is associated with a current voice or data session;
determining to transfer controlling of the coverage area between the first mobile device and the wireless communications network to the first mobile device such that the first mobile device determines when a larger coverage area with the wireless communications network is needed;
transferring the controlling of the coverage area between the first mobile device and the wireless communications network to the first mobile device;
determining a quantity of times that the first mobile device is to send each packet to the wireless communications network; and
determining a period of time associated with each packet transmission, the quantity of times and the period of time based on a balance between the coverage area between the first mobile device and the access component, an estimated time delay of the packet transmission, and a quality of service associated with the current voice or data session.

10. The non-transitory media of claim 9, wherein the access component is at the eNodeB in a voice over LTE (VoLTE) network.

11. The non-transitory media of claim 9, wherein the determination to transfer the control to the first mobile device is based on a user request.

12. The non-transitory media of claim 10, wherein the determination to transfer the control to the first mobile device is based on a current load of the access component.

13. The non-transitory media of claim 9, further comprising:
receiving an indication that the control of controlling the coverage area between the first mobile device and the access component is being transferred back to the access component; and
receiving the transfer of the control.

14. A method for dynamically optimizing power to increase a coverage area between a mobile device and a wireless communications network, the method comprising:
determining, at an access component in the wireless communications network, to transfer control of controlling the coverage area between a first mobile device and the access component to the first mobile device such that the first mobile device determines when a larger coverage area with the access component is needed;
transferring the control of controlling the coverage area between the first mobile device and the access component to the first mobile device;
at the first mobile device, determining that the coverage area between a first mobile device and the wireless communications network is to be increased from an existing coverage area to an expanded coverage area, the determination based on,
(1) an estimated time delay of a transmission of a packet based on a location of the first mobile device and a second mobile device associated with a current voice or data session, and
(2) a quality of service associated with the current voice or data session;
determining a quantity of times that the first mobile device is to send each packet to the wireless communications network and a period of time associated with each packet transmission, the quantity of times and the period of time based on a balance between the expanded coverage area, the estimated time delay of the transmission of the packet, and the quality of service associated with the current voice or data session; and
conducting a communication session at the first mobile device using the quantity of times that the first mobile device is to send each packet to the wireless communications network and the period of time associated with each packet transmission.

15. The method of claim 14, wherein the quantity of times that the first mobile device is to send each packet to the wireless communications network and the period of time associated with each packet transmission together provide an indication of how much time the packet has to consume energy before being sent to the wireless communications network.

16. The method of claim 14, wherein the quality of service is based on a numerical measure of a subjective quality of the current voice or data session.

17. The method of claim 14,
wherein the determination to transfer the control to the first mobile device is based on one or more of a current load of the access component or a user request.

* * * * *